US006810763B1

United States Patent
Frick et al.

(10) Patent No.: US 6,810,763 B1
(45) Date of Patent: Nov. 2, 2004

(54) ARRANGEMENT FOR ELECTRICALLY LOCKING THE STEERING SHAFT OF A STEERING DEVICE

(75) Inventors: Alexander Frick, Augsburg; Andreas Berger, Petershausen; Mario Pieh, Marktbreit; Joachim Engelmann, Ratingen; Kurt Lieb, Seligenstadt; Thomas Quellmalz, Darmstadt; Hagen Friedrich, Indersdorf; Harald Starken, Erdweg, all of (DE)

(73) Assignee: Valeo GmbH & Co. Scherheitssysteme, Erdweg (DE)

(*) Notice: Subject to any disclaimer, the term of this patent is extended or adjusted under 35 U.S.C. 154(b) by 0 days.

(21) Appl. No.: 09/504,535

(22) Filed: Feb. 15, 2000

(30) Foreign Application Priority Data

Feb. 15, 1999 (DE) .......................................... 199 06 302

(51) Int. Cl.[7] .............................................. B60R 25/02
(52) U.S. Cl. ............................. 74/492; 70/182; 70/185; 180/287
(58) Field of Search .............................. 74/492; 70/186, 70/185, 184, 183, 182, 252; 180/287

(56) References Cited

U.S. PATENT DOCUMENTS 4,773,241 A * 9/1988 Peitsmeier et al. ........... 70/252
5,896,765 A * 4/1999 Peyre et al. .................. 70/186
6,109,075 A * 8/2000 Schremmer .................. 70/186

FOREIGN PATENT DOCUMENTS

DE 36 06 564 * 6/1987
GB 2 328 661 * 3/1999

* cited by examiner

Primary Examiner—David A. Bucci
Assistant Examiner—William C Joyce
(74) Attorney, Agent, or Firm—Morgan & Finnegan, LLP

(57) ABSTRACT

An arrangement for locking the steering shaft of a motor vehicle, includes a blocking device and a toothed ring which is arranged on the steering shaft and in which a blocking element, which is arranged so that it can be displaced from an unlocked position into a locked position, of the blocking device engages. To allow the blocking device to be attached to the steering device of the vehicle in question and exchanged in a simple manner and to ensure that the blocking device cannot be removed in the locked state of the blocking element, the blocking device, which is provided with a housing, is releasably connected to a flange, which is attached to the steering device, via an adapter part. The flange has a recess which is designed in such a manner that the adapter part, for fitting of the blocking device, can be inserted in a partial area of the recess and can then be displaced along a guide into its limit position. Moreover, transverse webs are arranged between the teeth of the toothed ring, which webs, in the locked position of the blocking element, prevent axial displacement of the adapter part along the recess in the flange to the partial area.

5 Claims, 2 Drawing Sheets

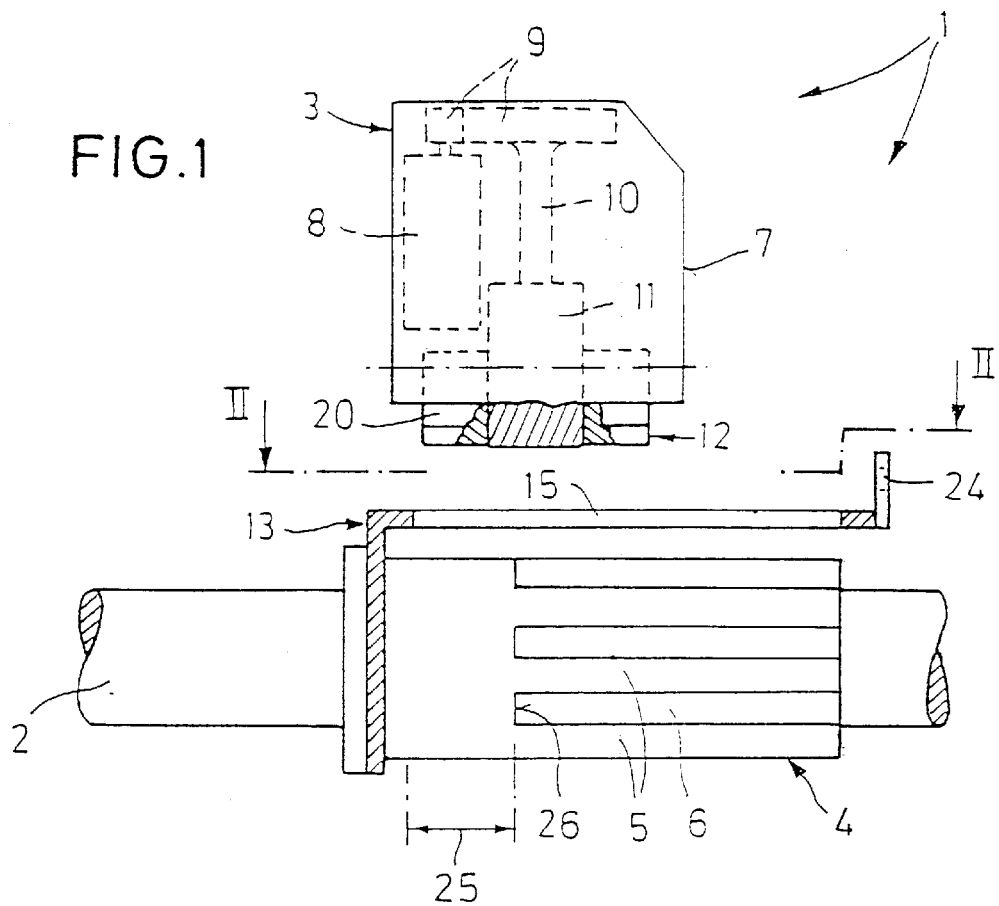
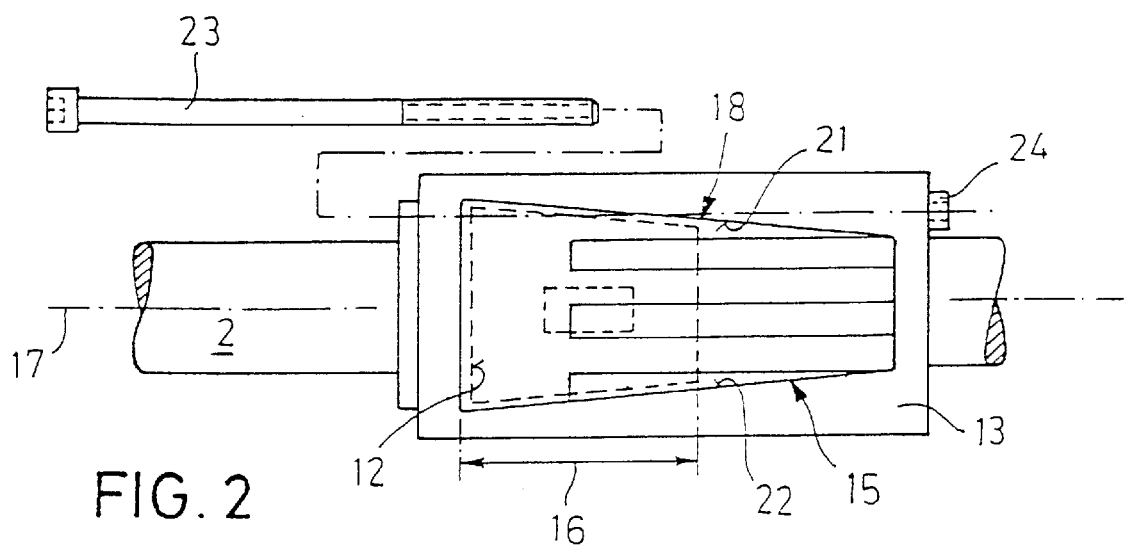

ARRANGEMENT FOR ELECTRICALLY LOCKING THE STEERING SHAFT OF A STEERING DEVICE

BACKGROUND OF THE INVENTION

The invention relates to an arrangement for locking the steering shaft of a steering device of a motor vehicle.

An arrangement of this nature is known, for example, from DE 197 19 343 C1. In this arrangement, the steering shaft is locked by a blocking device which comprises a blocking element which is arranged in such a manner that it can be displaced from an unlocked position into a locked position by means of an electric motor and which in its locked position engages in the recess, formed by adjacent teeth, in a toothed ring arranged on the outer circumference of the steering shaft. This known arrangement does not provide any further details concerning the way in which the blocking device is attached to the steering device.

DE 44 22 467 C1 has also disclosed a locking arrangement of the generic type, in which the blocking device includes a lever-like blocking element which can be pivoted by means of a magnet. The blocking device and the toothed ring, which is attached to the steering shaft, are situated in a common housing which is guided around the steering shaft of the vehicle. To prevent unauthorized third parties from interfering with the locking arrangement, that end of the blocking element which is remote from the toothed ring engages in a groove-like recess in the housing when the blocking element has pivoted into its locked position, thus preventing the housing from opening.

One of the drawbacks of this locking arrangement is that the blocking device takes a relatively long time to fit and remove, since the housing arranged on the steering shaft has to be opened to do this.

BRIEF SUMMARY OF THE INVENTION

The invention is based on the object of providing an arrangement of the type described at the outset in which the blocking device can both be attached in a simple manner to the steering device of the vehicle in question and exchanged quickly, while ensuring that it is impossible to remove the blocking device in the locked state of the blocking element.

According to the invention, this object is achieved by means of the features of claim 1. Further, particularly advantageous configurations of the invention are disclosed by the subclaims.

The invention is fundamentally based on the principle of releasably connecting the blocking device, which is provided with a housing, to a flange, which is attached to the steering device, via an adapter part which is assigned to the blocking device and serves as a blocking-pin guide. The flange has a recess which is designed in such a manner that the adapter part, in order for the blocking device to be fitted, can be inserted in a first partial area of the recess and can then be displaced along a guide into its limit position, in which the blocking element is situated above the toothed ring area into which it is to engage when used correctly. Moreover, transverse webs are arranged between the teeth of the toothed ring, which webs, in the locked position of the blocking element, prevent axial displacement of the adapter part along the recess in the flange to the first partial area, so that the blocking device cannot be removed by unauthorized third parties in the locked position of the blocking element.

In an advantageous embodiment of the invention, the adapter part is designed with grooves which are arranged in the shape of a trapezoid in the direction of the steering shaft axis and which engage in a recess in the flange, which is likewise in the shape of a trapezoid. The trapezoidal arrangement of the attachment grooves in the adapter part ensures that, during fitting, the flanks of the attachment flange come to bear against the corresponding groove base of the adapter part, even if manufacturing tolerances cause the component dimensions to vary within defined limits. Consequently, the adapter part rests without play in the recess in the flange, so that in the event of loads being applied to the locked blocking pin as a result of a torque being applied to the steering shaft, there are no tolerances which have to be overcome by shifting the adapter part before the force flux from the blocking pin via the adapter part onto the frame parts of the steering shaft is closed.

Furthermore, it has proven advantageous if, for releasably connecting the adapter part on the flange, there is an attachment screw, which extends in the axial direction and, when this screw is tightened, the adapter part is at the same time displaced into its limit position. The attachment screw may be designed as a cap screw and may be guided through the adapter part and engage in a threaded part arranged on the flange.

BRIEF DESCRIPTION OF THE DRAWINGS

Further details and advantages of the invention will emerge from the following exemplary embodiments explained with reference to figures, in which:

FIG. 1 shows a side view of an arrangement according to the invention with a blocking device and a toothed ring arranged on a steering shaft, before the blocking device is fitted to the steering device;

FIG. 2 shows a plan view of the steering shaft, on the line which is denoted by II—II in FIG. 1;

DETAILED DESCRIPTION OF THE INVENTION

Figure 3:
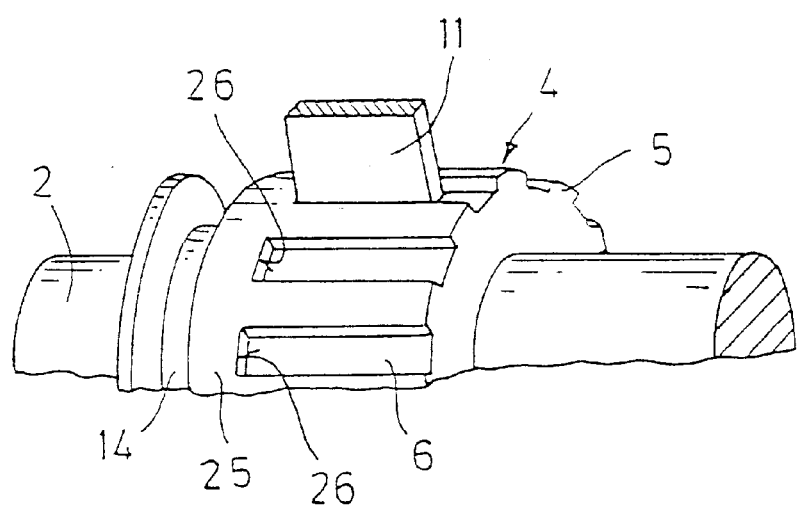
FIG. 3 shows a perspective view of part of the toothed ring illustrated in FIG. 1, with the blocking element of the blocking device in engagement.

In FIG. 1, 1 denotes an arrangement according to the invention for locking the steering shaft 2 of a motor vehicle. The arrangement 1 comprises a blocking device 3 and a toothed ring 4 which is arranged on the outer circumference of the steering shaft 2 and has teeth 5, which are distributed over the circumference, and recesses 6, which are arranged between the teeth.

The blocking device 3 comprises an electric motor 8 which is arranged in a housing 7 and, via a toothed transmission 9 and a spindle drive 10, displaces a blocking element 11 from an unlocked position into a locked position and vice versa. The blocking element 11, which is designed as a blocking pin, engages, in its locked position, in the recesses 6 in the toothed ring 4, which are formed by adjacent teeth 5.

In order for the blocking device 3 to be attached to the steering device of the vehicle, the blocking device 3 has, on its side facing toward the toothed ring 4, an adapter part 12 which is partially enclosed by the housing 7 and the steering device has a flange 13. The adapter part 12 is not only used to attach the blocking device 3 to the steering device, but also is responsible for guiding the blocking element 11 and is designed in such a manner that, in the event of the steering shaft 2 being twisted violently in the locked state of the blocking element 11, it absorbs the forces acting on this element, so that in such an event there is no damage to the actuator or the electric motor 8.

The flange 13, which is of L-shaped design, is mounted in an annular groove 14 (FIG. 3) in the toothed ring 4 and is connected in a rotationally fixed manner on the tubular sleeve which surrounds the steering shaft 2 but is not shown for the sake of clarity.

The flange 13 has a recess 15 which is in the shape of a trapezoid (FIG. 2) and is designed in such a manner that the adapter part 12, which is likewise in the shape of a trapezoid in the side facing toward the toothed ring 4 and is shown in dashed lines in FIG. 2, can be inserted in the partial area of the recess 15 which is denoted by 16. Then, the adapter part 12 can be displaced along a guide 18, in the direction of the longitudinal axis 17 of the steering shaft 2, into its limit position, in which the blocking element 11 is situated above the toothed ring area into which it is to engage when used correctly.

For the adapter part 12 to be displaced into its limit position, the adapter part has longitudinal grooves 20 (FIG. 1) into which the side walls 21, 22 of the recess 15, which extend in the axial direction, engage.

The adapter part 12 is displaced and fixed in its limit position with the aid of an attachment screw 23 which extends in the axial direction (FIG. 2). This screw is guided through the adapter part 12 (as indicated by the dot-dashed line in FIG. 1) and is screwed into a threaded part 24 attached to the flange 13.

As can be seen from the figures, the toothed ring 4, in the partial area 16 of the flange 13, in a partial area 25, has a diameter which corresponds to the diameter of the circular cap of the toothed ring. Therefore, it is only possible to insert the adapter part 12 into the recess 15 when the blocking element 11 is in its unlocked position.

If the adapter part 12 (and therefore also the blocking device 3) is in its limit position and the blocking element 11 is in its locked position, it is impossible to remove the blocking device 3, for example by loosening the attachment screw 23. This is because the displacement of the adapter part 12 toward the partial area 16 in order to remove the blocking device 3 causes the blocking element 11 to come into contact with the transverse webs 26, formed by the partial area 25 of the toothed ring 4 before it reaches the partial area 16. However, in this position the side walls 21, 22 of the recess 15 still engage in the longitudinal grooves 20 in the adapter part 12. Only when the blocking element 11 is in its unlocked position can the adapter part 12 be displaced further and removed after the removal position has been reached.

Of course, the invention is not limited to the exemplary embodiment described above. For example, the recess in the flange does not necessarily have to be in the shape of a trapezoid. A stepped square or stepped rectangular shape is also conceivable.

Moreover, it is also possible for a partial area of the tubular sleeve of the threaded spindle to be used as a flange, in which case the corresponding recess for introduction of the adapter part is arranged in this partial area of the tubular sleeve.

What is claimed is:

1. An arrangement for locking a steering shaft of a steering device of a motor vehicle comprising:

a blocking element, which is arranged so that it can be displaced with respect to the steering shaft of the vehicle from an unlocked position into a locked position, of a blocking device, which is provided with a housing and, in its locked position, engages in a recess, formed by adjacent teeth, in a toothed ring arranged on the outer circumference of the steering shaft; the blocking device including an adapter which can be releasably connected to a flange attached to the steering device;

the flange having a recess which is designed in such a manner that the adapter, in order for the blocking device to be fitted, can be inserted in a partial area of the flange recess and can then be displaced along a guide into a limit position, in which the blocking element is situated above the toothed ring area into which it is to engage in the locked position and; transverse webs disposed between the teeth of the toothed ring, which webs, in the locked position of the blocking element, prevent axial displacement of the adapter along the recess in the flange to the partial area.

2. An arrangement according to claim 1, wherein the recess in the flange and that area of the adapter which can be introduced into the recess are in the shape of a trapezoid, and wherein, for guidance of the adapter, the latter has longitudinal grooves in which the side walls of the flange recess which extend in the axial direction engage.

3. An arrangement according to claim 1, wherein, for releasably connecting the adapter on the flange, there is an attachment screw which extends in the axial direction and, when this screw it tightened, the adapter is at the same time displaced into its limit position.

4. An arrangement according to claim 3, wherein the attachment screw is designed as a cap screw and is guided through the adapter, and wherein a threaded part, in which the attachment screw engages, is arranged on the flange.

5. An arrangement according to claim 1, wherein the blocking device comprises a blocking element which can be displaced by an electric motor via an actuator.

\* \* \* \* \*

UNITED STATES PATENT AND TRADEMARK OFFICE
CERTIFICATE OF CORRECTION

PATENT NO.     : 6,810,763 B1
DATED          : November 2, 2004
INVENTOR(S)    : Frick et al.

It is certified that error appears in the above-identified patent and that said Letters Patent is hereby corrected as shown below:

<u>Title page,</u>
Item [30], Foreign Application Priority Data, "199 06 302"
should read -- 199 06 302.8 --.

Signed and Sealed this

Twenty-eighth Day of June, 2005

JON W. DUDAS
*Director of the United States Patent and Trademark Office*